Feb. 20, 1951     H. W. SULLIVAN     2,542,726
METHOD OF FORMING INDUCTOR COILS
Filed June 30, 1945     2 Sheets-Sheet 1
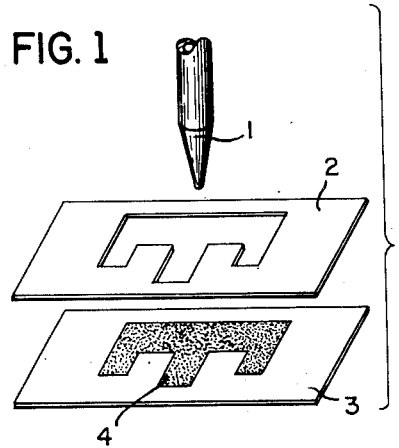
FIG. 1
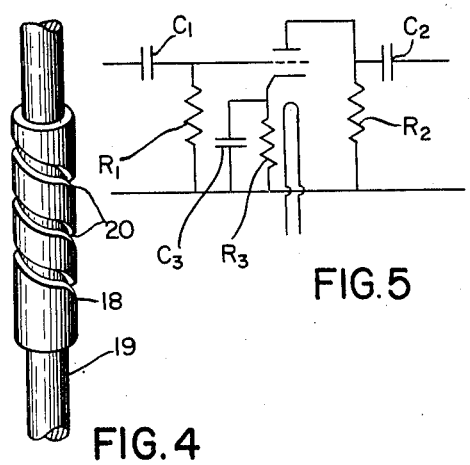
FIG. 4     FIG. 5
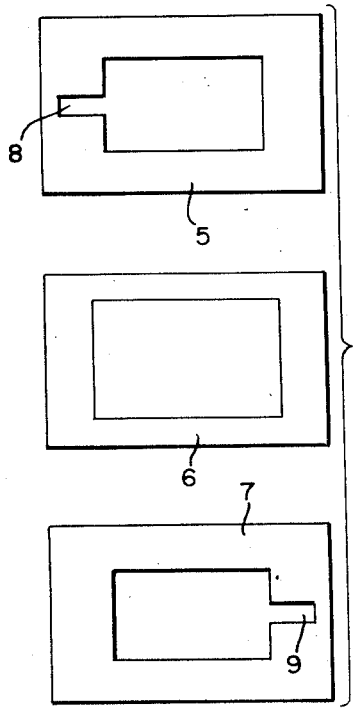
FIG. 2
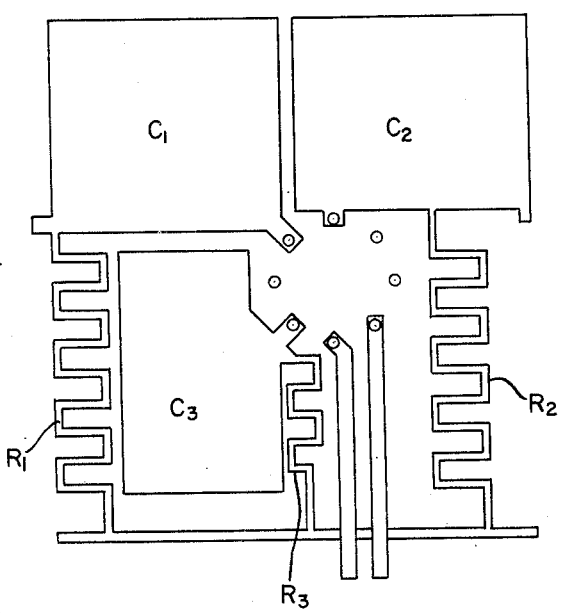
FIG. 6
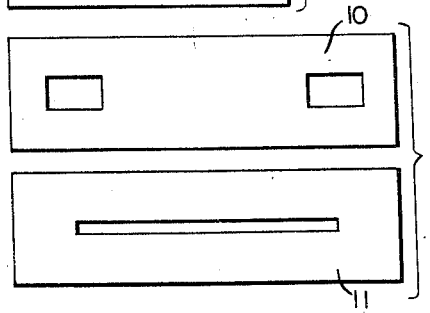
FIG. 3
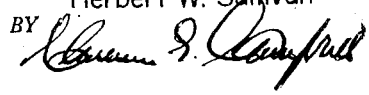
*INVENTOR.*
Herbert W. Sullivan
BY
ATTORNEY Feb. 20, 1951  H. W. SULLIVAN  2,542,726
METHOD OF FORMING INDUCTOR COILS
Filed June 30, 1945  2 Sheets-Sheet 2

*INVENTOR.*
Herbert W. Sullivan
BY
ATTORNEY

Patented Feb. 20, 1951

2,542,726

UNITED STATES PATENT OFFICE 2,542,726

METHOD OF FORMING INDUCTOR COILS

Herbert W. Sullivan, Greenwich, Conn.

Application June 30, 1945, Serial No. 602,487

2 Claims. (Cl. 117—38)

My invention relates to a new process for the construction or fabrication of electric circuits by which I incorporate all leads and components in one integral unit, eliminating the use of free wires, the use of solder and the need of screws, bolts and containing brackets to secure and maintain the leads and components in place.

The object of my invention is the production of a continuous electric circuit of a conducting material with component parts to be applied to the surface of a plastic or other non-conducting base of insulating material by such means as will eliminate vibration, the possibility of fracture from soldered or other artificial joints and reduce in great measure the possibility of corrosion and deterioration.

I attain these objects by the mechanism illustrated in the accompanying drawings in which—

Figure 7:
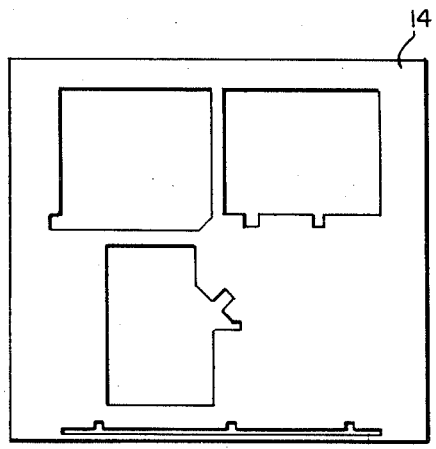
Figure 8:
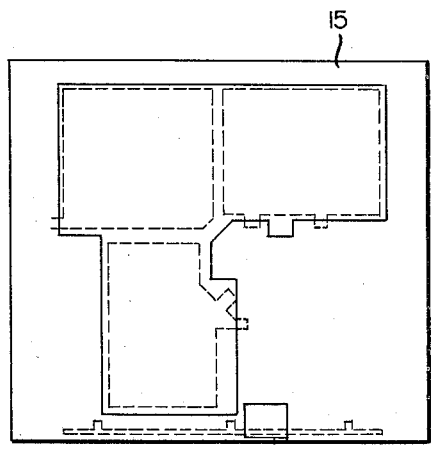
Figure 9:
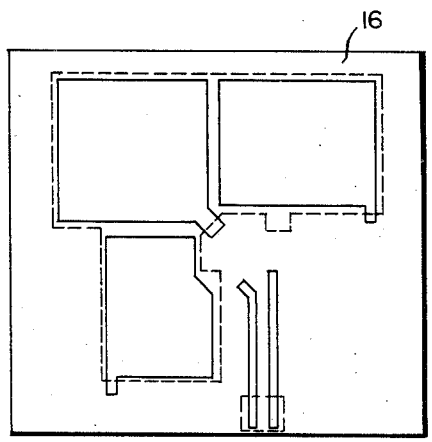
Figure 10:
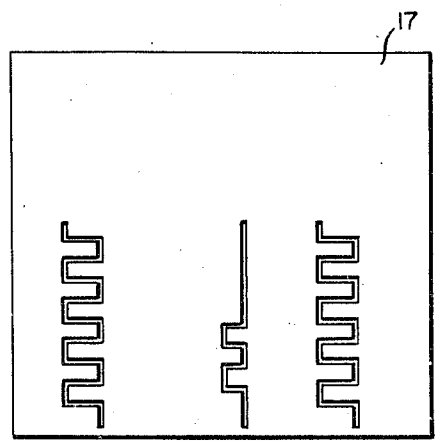

Fig. 1 is an illustration of a cutout stencil and the method of general application. Fig. 2 is an illustration showing the application of the method in the fabrication of condensers. Fig. 3 illustrates the application of the method in the fabrication of resistors. Fig. 4 illustrates a stencil designed for the fabrication of inductors. Figs. 5 and 6 illustrate the application of the method to the fabrication of a complete circuit. Figs. 7, 8, 9 and 10 illustrate the order of the application of stencils used in fabricating the circuit shown in Figs. 5 and 6.

In Fig. 1 is shown a stencil, 2, cut out in the form of the projected coating; this stencil is affixed to the non-conducting base 3. 1 is the nozzle of a spray-gun through which is sprayed a substance bearing a metallic conducting material. By means of the operation of the spray gun the metallic coating, 4, is affixed to the plastic or non-conducting base, 3. This device may be utilized to affix to the non-conducting base, or other insulating material, a conducting coating of almost any conceivable shape. In this manner all leads and inter-connections in any electric circuit may be produced.

Fig. 2 illustrates the process of fabrication of condensers in a manner analogous to that of the fabrication of leads and connectors. The three stencils, 5, 6, and 7, respectively, are employed in the manner described in Fig. 1 as follows: Stencil 5, which illustrates a condenser plate together with a short lead, 8, is placed upon the insulating surface of the non-conducting base 3 and the metallic coating is sprayed thereon. When the metallic coating has become affixed to the surface of the insulating material by means of a drying or other suitable process, stencil 5 is replaced by stencil 6, which is cut out in such a shape as to expose all of the area of metallic coating affixed by means of stencil 5, except for that indicated by the numeral 8 on stencil 5. A lacquer or varnish or other insulating substance is then sprayed upon the exposed metallic coating thus imposing a thin insulating film upon the condenser plate formed by the metallic coated surface produced by means of stencil 5. When the film of insulating material thus produced by stencil 6 is sufficiently affixed by a drying or other suitable process, stencil 6 is replaced by stencil 7 which serves as a mask for the application of another metallic coating by the means described above. This metallic coating forms the second condenser plate. It bears a short extension or lead marked 9.

The process described in the foregoing paragraph may be repeated any desired number of times by the consecutive application of metallic coating masked by the use of stencils 5 and 7, each metallic coating being separated from the adjacent coating by means of an intervening insulating coating produced with the aid of stencil 6. Alternate plates, that is, all of those produced through the use of either stencil 5 or stencil 7 contact each other at the short leads 8 and 9, respectively, the insulating material being prevented from affecting these portions on account of the shape of the stencil 6 as heretofore described.

Fig. 3 illustrates the method of fabricating resistances in a manner analogous to that described for capacitors, conductors and inter-connecting leads. Below the schematic symbol for a resistance are drawings of two stencils, 10 and 11. Stencil 10 is placed upon an insulating material or non-conducting base and a substance bearing a metallic conducting compound is sprayed thereon. This process produces the leads of the resistor. Stencil 11 is now placed upon the insulating material. The cutout portion of stencil 11 is a thin slit, the ends of which are so registered as to appear over the leads produced by stencil 10. A substance bearing a metallic conductor of moderate or low conductivity or a semi-conducting compound is now sprayed upon stencil 11, thus producing on the non-conducting base a resistor. The value of the resistance may be regulated by varying the composition of the material from which it is formed or by varying the width or length of the slit, or by adjusting the duration of spraying, thus affecting the thickness of the resistive coating.

Fig. 4 illustrates the method of fabricating inductors by the methods described. The drawing illustrates the helical stencil 18 employed in the fabrication. This stencil 18 is placed over an insulating rod 19 and the conducting metallic substance is sprayed on the intervening spaces 20 by the means described above, imposing a winding coating of the conductive material on the rod 19. When the coating is affixed to the surface the stencil is then parted by a convenient means and removed from the rod. A lacquer or varnish is then sprayed on the rod over all the windings of the metallic coating except on one small portion on one end which becomes the connection between the succeeding layers of windings. The stencil is then replaced and the operation is repeated: thus succeeding layers of windings may be applied by alternately spraying layers of metallic coating and insulating material. Stencils of the type shown in Fig. 4 may be made from metal band helical springs in which case means of parting would not be required, removal of the stencil can be accomplished by compression and the resultant widening of the spring.

Fig. 5 shows a drawing of a schematic diagram of the circuit of one stage of a resistance coupled amplifier, as familiarly known to the art. Below this diagram is a drawing, Fig. 6, which illustrates the application of the techniques described in Figs. 1, 2, 3, and 4, to the complete electric circuit shown in drawing Fig. 5 of the conventional circuit. In this outline drawing Fig. 6 the circuit designations $C_1$ and $C_2$, and $C_3$, and $R_1$, $R_2$, and $R_3$, represent the circuit elements illustrated in the schematic Fig. 5 as prepared by my spraying and stencil method.

Figs. 7 to 10 illustrate the stencils used in the fabrication of the circuit shown in Figs. 5 and 6. These drawings show the stencils which are successively applied in the numerical order indicated. 14 is the stencil which is first applied to produce conducting coating connecting the tube elements to one side of the proper condensers, and to connect the filament leads to the proper sockets provided for the tube, as indicated in Fig. 5; also to produce one plate of the condensers. Stencil 15 is then superimposed upon the coating produced by the application of stencil 14, and is used in the application of a layer of insulating material over the conducting material which has been applied by means of stencil 14: parts of the condenser leads are protected for the purpose of making contact of alternate plates, as above described; also protected is that portion of the ground wire where the filament leads are designed to cross. Stencil 16 is used with the material bearing a metallic conducting compound and produces a second layer or plate of the condensers. Stencil 15 is now applied again for the purpose of imposing another insulating layer, after which the process is repeated, utilizing stencils 14, 15 and 16 consecutively. The capacitance of the condensers is now sufficient. Stencil 17 is used for the application of the conducting material, by means of spraying, as described, for the purpose of forming resistors.

Sockets for the tubes may be made in the conventional manner by riveting metallic contacts to the non-conducting base.

The process has so far been described as a method for producing, by spraying, electric circuits which consist of thin layers or foils of conductors or semi-conductors, or insulators combined and distributed in such a manner that they represent a major portion of the circuit. These thin layers or foils may be produced in manners or methods other than by spraying, without changing the functioning or the essential basic principle of the invention.

A second alternate method is the utilization of the process known a metallizing. Instead of spraying with a substance in which is suspended a conducting or semi-conducing material in a liquid form as heretofore described, the same result can be attained by the similar process of vapor deposition of the desired metal.

I claim:

1. The method of forming an inductor coil by placing a helical stencil over an insulating rod, spraying a metallic conducting substance on the intervening spaces by a spray gun and spraying an insulating lacquer over the windings of the metallic conducting substance except for the connection ends and removing of the helical stencil by compression of the same effecting a resulting widening of same and permitting the removal of said stencil.

2. The method of forming an inductor coil by placing a helical stencil over an insulating rod, spraying a metallic conducting substance on the intervening spaces by a spray gun and spraying an insulating lacquer over the windings of the metallic conducting substance except for the connection ends and repeating said steps to form an inductor coil of increased inductance and removing the helical stencil by compression of the same effecting a resulting widening of said stencil permitting the removal of said stencil.

HERBERT W. SULLIVAN.

REFERENCES CITED

The following references are of record in the file of this patent:

UNITED STATES PATENTS

| Number | Name | Date |
|---|---|---|
| 636,203 | Helberger | Oct. 31, 1899 |
| 1,638,943 | Little | Aug. 16, 1927 |
| 1,647,474 | Seymour | Nov. 1, 1927 |
| 1,697,316 | Horny | Jan. 1, 1929 |
| 1,820,240 | Michell | Apr. 25, 1931 |
| 1,837,678 | Ryder | Dec. 22, 1931 |
| 1,846,844 | Clark | Feb. 23, 1932 |
| 2,036,425 | Mayoral | Apr. 7, 1936 |
| 2,066,511 | Arlt | Jan. 5, 1937 |
| 2,077,187 | Richter | Apr. 13, 1937 |
| 2,166,139 | Guthrie et al. | July 18, 1939 |
| 2,166,367 | Norris | July 18, 1939 |
| 2,182,968 | Lunsford | Dec. 12, 1939 |
| 2,244,009 | Hiensch | June 3, 1941 |
| 2,389,419 | Deyrup | Nov. 20, 1945 |
| 2,389,420 | Deyrup | Nov. 20, 1945 |
| 2,390,025 | Deyrup et al. | Nov. 27, 1945 |
| 2,399,313 | Ballard | Apr. 30, 1946 |
| 2,413,949 | Broverman | Jan. 7, 1947 |
| 2,441,960 | Eisler | May 25, 1948 |
| 2,474,988 | Sargrove | July 5, 1949 |

FOREIGN PATENTS

| Number | Country | Date |
|---|---|---|
| 349,706 | Great Britain | June 4, 1931 |